United States Patent
Grubb et al.

(10) Patent No.: US 10,097,274 B2
(45) Date of Patent: Oct. 9, 2018

(54) FIBER OPTIC SWITCHING NETWORK USING A WIDEBAND COMB LASER

(71) Applicant: Facebook, Inc., Menlo Park, CA (US)

(72) Inventors: Stephen Gregory Grubb, Atherton, CA (US); Satyajeet Singh Ahuja, Cupertino, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/688,802

(22) Filed: Aug. 28, 2017

(65) Prior Publication Data

US 2018/0062750 A1  Mar. 1, 2018

Related U.S. Application Data

(60) Provisional application No. 62/380,690, filed on Aug. 29, 2016.

(51) Int. Cl.
| | |
|---|---|
| *H04B 10/50* | (2013.01) |
| *H01S 3/00* | (2006.01) |
| *H04J 14/02* | (2006.01) |
| *H04B 10/572* | (2013.01) |
| *H01S 3/23* | (2006.01) |
| *G01J 3/18* | (2006.01) |

(52) U.S. Cl.
CPC .......... *H04B 10/506* (2013.01); *G01J 3/1895* (2013.01); *H01S 3/0085* (2013.01); *H01S 3/2383* (2013.01); *H04B 10/572* (2013.01); *H04J 14/02* (2013.01)

(58) Field of Classification Search
CPC ... H04B 10/506; H04B 10/572; G01J 3/1895; H01S 3/2383; H01S 3/0085; H04J 14/02

USPC .......................................................... 398/45
See application file for complete search history.

(56) References Cited

U.S. PATENT DOCUMENTS

| | | | |
|---|---|---|---|
| 6,734,411 B1 | 5/2004 | Imbsei et al. | |
| 7,113,708 B1 | 9/2006 | Creaney et al. | |
| 2004/0258420 A1* | 12/2004 | Sayyah ............ | H04B 10/25752 398/183 |
| 2006/0239609 A1* | 10/2006 | Sorin ...................... | H04J 14/02 385/24 |
| 2010/0188735 A1 | 7/2010 | Tamaoki et al. | |
| 2013/0195450 A1 | 8/2013 | Ashwood-Smith et al. | |
| 2013/0315269 A1* | 11/2013 | Liu ...................... | H01S 5/06256 372/20 |
| 2014/0233957 A1* | 8/2014 | Watanabe ................ | H04B 3/32 398/91 |

(Continued)

OTHER PUBLICATIONS

Non-Final Office Action dated Jul. 28, 2017 for U.S. Appl. No. 15/285,382 for Taylor, J. et al. filed Oct. 4, 2016.

(Continued)

*Primary Examiner* — Juan A Torres
(74) *Attorney, Agent, or Firm* — Van Pelt, Yi & James LLP

(57) ABSTRACT

A fiber optic switching network includes a comb laser source that provides laser light at a plurality of wavelengths on a single optical fiber. Light from the comb laser source is directed into different optical fibers by a demultiplexer such as an arrayed waveguide grating (AWG) or cyclic AWG. Light from the demultiplexer is modulated with one or more demodulators and re-combined with a multiplexer into a single optical fiber for transmission to a destination.

20 Claims, 3 Drawing Sheets

(56) References Cited

U.S. PATENT DOCUMENTS

2017/0099106 A1   4/2017   Taylor et al.

OTHER PUBLICATIONS

Recommendation ITU-T G.694.1 (Feb. 2012) Series G. Transmission Systems and Media, Digital Systems and Networks Transmission media & optical systems characteristics—Characteristics of optical systems Spectral grids for WDM applications: DWDM frequency grid.
U.S. Appl. No. 15/285,382 by Taylor, J., et al., filed Oct. 4, 2016.

* cited by examiner

FIBER OPTIC SWITCHING NETWORK USING A WIDEBAND COMB LASER

CROSS-REFERENCE TO RELATED APPLICATION(S)

This application claims priority to and benefit from U.S. Provisional Patent Application Ser. No. 62/380,690 titled "FIBER OPTIC SWITCHING NETWORK USING A WIDEBAND COMB LASER" filed on Aug. 29, 2016, the content of which is incorporated by reference in its entirety herein.

TECHNICAL FIELD

The following disclosure relates generally to fiber optic networks and in particular to fiber optic switching networks that can route data carried on optical fibers between processing units.

BACKGROUND

In many modern computer installations, optical fibers are often used as a communication link to route data from one computer to another. Fiber optic cables are a preferred communication link because of their low loss and high immunity to external interference. With most fiber optic transmission schemes, a laser diode or other coherent light source generates light at a specific wavelength that is modulated according to a particular pattern of bits to be transmitted. The modulated light is coupled into an optical fiber to carry the light to a switch fabric that routes the light to an intended destination. In some cases, an optical fiber will carry only a single wavelength of light. In other cases (generally called wavelength division multiplexing or WDM) an optical fiber will carry multiple wavelengths of light each bearing its own data signal. Such optical fibers can carry data within a single building, between buildings, over a metropolitan area, or cross country and inter-continentally (so called long haul).

In complex networks, such as in server farms or data centers, the number of optical fibers required to connect all the servers and other electronic components can be substantial. For example, simply routing signals between buildings in a data center can require 20,000-40,000 separate optical fibers. Because the light generated in each of these fibers is produced from a separate light source, the power required to operate the communication system (including cooling systems required to regulate the heat generated by the communications electronics) is significant.

SUMMARY OF CERTAIN EMBODIMENTS

The present disclosure relates to systems and methods that reduce the number of fiber optic cables and light sources in a computer communication network.

According to an aspect of the present application, a fiber optic switching network is provided. The fiber optic switching network may include a comb laser source configured to produce laser light at a plurality of wavelengths on a single optical fiber, and an optical demultiplexer coupled to the comb source and configured to receive light having a first set of the plurality of wavelengths and to direct different wavelengths from the first set of the plurality of wavelengths into different output optical fibers. The fiber optic switching network can further include two or more optical modulators configured to modulate the light received from the optical demultiplexer. Each modulator can be coupled to one of the different output optical fibers to receive light of a particular wavelength and to modulate the light of the particular wavelength in accordance with a corresponding data signal. An optical multiplexer can be coupled to the two or more optical modulators and configured to combine modulated light from the two or more optical modulators into a single optical fiber for routing to an intended destination.

According to another aspect of the present application, a method of optical communication is provided. The method may comprise: providing an optical signal from a comb laser source including a plurality of approximately equally spaced wavelength bands; splitting the optical signal into two or more sets of wavelength bands; using an optical demultiplexer to route light corresponding to each wavelength band within a first set of the wavelength bands to a corresponding output of the optical demultiplexer; using an optical modulator to modulate the light corresponding to each wavelength band that is output by the optical demultiplexer by a corresponding data signal to encode data onto the individual wavelength bands; combining the modulated wavelength bands to form a modulated optical signal for transmission on a single optical fiber; and transmitting the modulated optical signal to an intended destination via the single optical fiber.

According to yet another aspect of the present application, a system for optical communication is provided. The system may include a comb laser source configured to produce laser light having a plurality of approximately equally spaced wavelength bands on a single optical fiber. An arrayed wave guide grating can be configured to receive the plurality of wavelength bands from the single optical fiber and direct different sets of wavelength bands into different output channels of the arrayed waveguide grating. In some embodiments, each set of wavelength bands includes two or more of the wavelength bands. The system can further include a plurality of optical demultiplexers coupled to the output channels of the arrayed waveguide grating. Each optical demultiplexer can be configured to receive one set of the wavelength bands and to direct each individual wavelength band within the received set of wavelength bands onto an output port of the optical demultiplexer. A plurality of optical modulators can be coupled to the plurality of optical demultiplexers, and each optical modulator can be configured to modulate the individual wavelength band received from one output port of the plurality of optical demultiplexers in accordance with a data signal. A plurality of optical multiplexers can be coupled to the plurality of optical modulators, wherein each optical multiplexer can be configured to combine the modulated wavelength bands to form one of the different sets of wavelength bands with modulated data carried therein for transmission to an intended destination.

DETAILED DESCRIPTION

As indicated above, most fiber optic communication links utilize separate light sources for each element that can communicate on the network. These light sources typically transmit on different wavelengths within a particular band. Popular bands include the S-band (1460-1530 nm), the C-band (1530-1565 nm), and the L-band (1565-1625 nm). The particular band selected is often determined by the composition of the fiber and how far the signals need to travel. Using separate lasers for each optical fiber on which signals and fiber are transmitted consumes a significant amount of power, space, and cooling. In addition, each individual laser is a potential source of failure in the system that may need to be replaced, and locating failed fibers for replacement can be time-consuming.

Figure 1:
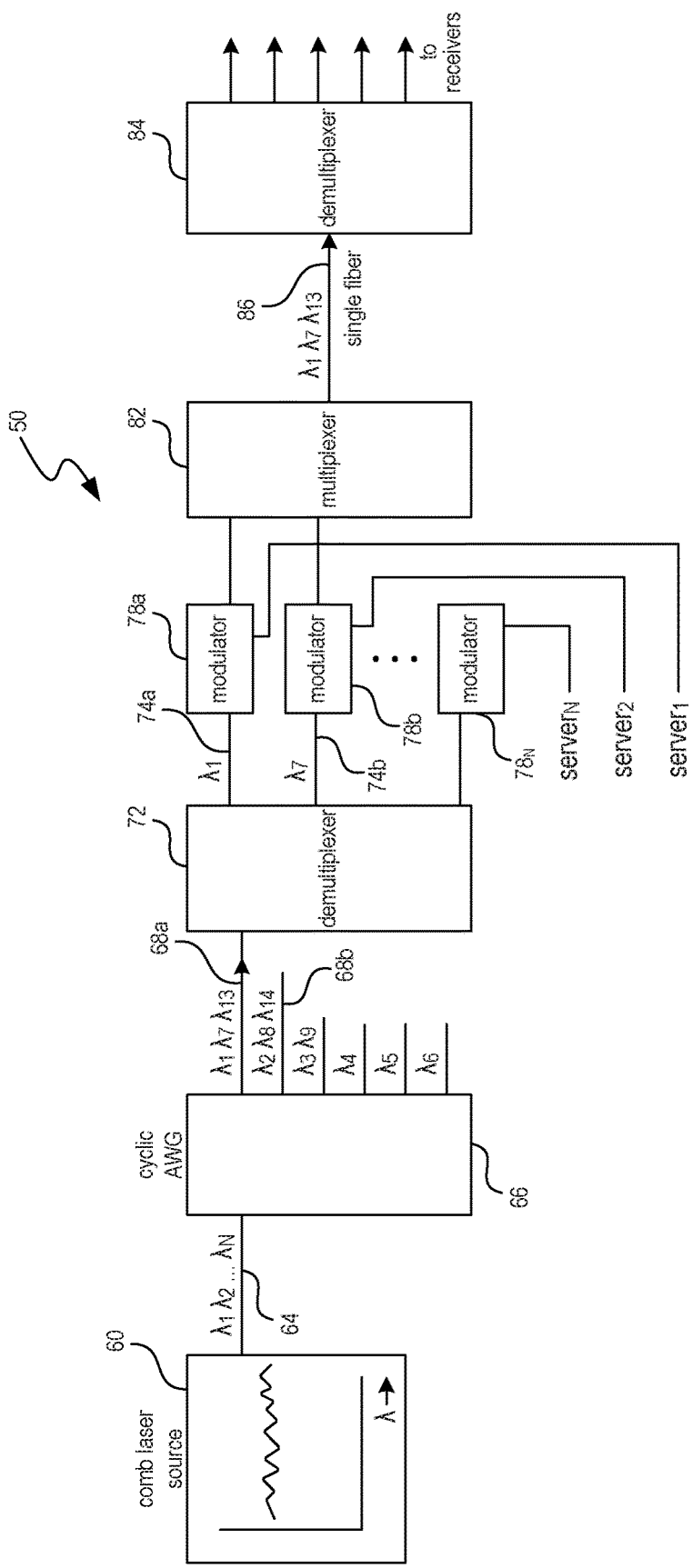
FIG. 1 illustrates a fiber optic switching network including a wideband comb laser light source in accordance with embodiments of the present technology.

FIG. 1 shows one embodiment of a fiber optic switching network 50 ("switching network 50") that is useful in data centers, metropolitan areas, or long haul environments. In the switching network 50, a laser source 60 provides light at multiple wavelengths. For example, the laser source 60 can be a wideband comb laser source. One example of a wideband comb laser is the TeraTone™ Low Noise Frequency Comb laser available from Ram Photonics of San Diego, Calif.

The laser source 60 (e.g., a comb laser source 60) generates laser light at multiple wavelengths depending on the wavelength of a seed laser that is applied. The seed lasers can be selected to change the range of wavelengths produced and the spacing between wavelengths. Accordingly, the comb laser source 60 is an optical source with multiple spectral lines (e.g., wavelength bands or combs). In some embodiments, the spectral lines produced by the comb laser source 60 can be approximately equally spaced. The frequency (and so the wavelength) of each spectral line is spaced a predetermined frequency (or wavelength) from two adjacent spectral lines, one higher in frequency (shorter in wavelength) and the other lower in frequency (longer in wavelength). Each spectral line may have a shape or amplitude that is a function of frequency (or wavelength). In other embodiments, the comb laser source 60 may produce spectral lines that are not evenly spaced and/or that do not have nearly equal amplitudes.

In some embodiments, the different wavelengths produced by the comb laser source 60 are used to carry information in different optical fibers. For example, if the comb laser source 60 produces light in 100 distinct wavelength bands, then the single laser source can supply light to 100 different optical fibers, thereby eliminating the need to supply each optical fiber with light from a different laser. The cost saving effected by reducing the number of components (e.g., the number of individual laser sources, the electronic and electrical components associated with each laser source, and the required connectors, couplers, etc.) may be significant. Moreover, a more efficient and flexible configuration can be implemented using the comb laser source 60 without concerns regarding the real estate, connectivity, and physical components that would be needed to add (or remove) one or more laser sources.

In the illustrated embodiment, a number of wavelengths of light ($\lambda_1 \lambda_2 \lambda_3 \lambda_4 \ldots \lambda_n$) produced by the comb laser source 60 are carried on a single optical fiber 64. To split the light into different optical fibers, the light is applied to an optical demultiplexer, e.g., an arrayed waveguide grating (AWG) 66 that directs incoming light on an input optical fiber to one of a number of output optical fibers (e.g., output channels) depending on its wavelength. As will be appreciated by those skilled in the art, the AWG 66 can also work in reverse by combining light received on several optical fibers into a single optical fiber.

In some embodiments, the AWG 66 is a cyclic AWG. In a cyclic AWG, light having different wavelengths is cyclically distributed from an input optical fiber to different output optical fibers. For example, in the illustrated embodiment, a first output optical fiber 68a receives light having wavelengths $\lambda_1, \lambda_7, \lambda_{13}$ etc., while a second output optical fiber 68b receives light of wavelengths $\lambda_2, \lambda_8, \lambda_{14}$ etc. In this example, the cyclic AWG is a 6-channel cyclic AWG that distributes every sixth wavelength onto the same output optical fiber. In other embodiments, the cyclic AWG can have any number of channels (e.g., 4, 8, 16, etc.) such that every $n^{th}$ (e.g., $4^{th}, 8^{th}, 16^{th}$, etc.) wavelength is distributed onto the same output optical fiber, while the interceding wavelengths are distributed to different output optical fibers. In general, the cyclic AWG 66 can receive laser light from the comb laser source 60 and output the laser light onto N output channels (N>2). Each wavelength can be separated from an adjacent wavelength in the same output channel by N multiplied by the separation between each comb output of the comb laser source.

In some embodiments, the wavelengths $\lambda_1 \lambda_2 \lambda_3 \lambda_4 \ldots \lambda_n$ produced by the comb laser source 60 are of increasing magnitude (e.g., $\lambda_2 > \lambda_1, \lambda_3 > \lambda_2$, etc.). Accordingly, the AWG 66 can distribute different wavelengths onto the different output optical fibers such that the wavelengths carried by each output optical fiber have a maximum separation (e.g., separated from the nearest neighboring wavelengths). For example, in the 6-channel cyclic AWG illustrated in FIG. 1, the five nearest neighboring wavelengths $\lambda_2$-$\lambda_6$ to the wavelength $\lambda_1$ are all distributed to different output optical fibers. Where the spacing between adjacent wavelengths in the optical signal is not large, breaking up the optical signal in this manner can make it easier to subsequently modulate and/or combine the wavelengths carried by each output optical fiber.

Light on any of the output optical fibers 68 from the cyclic AWG 66 is further separated into individual optical fibers (e.g., output channels) by an optical demultiplexer 72. Additional demultiplexers (not shown) can be implemented to receive the additional outputs of the AWG. The demultiplexer 72 could be an AWG, but other optical demultiplexers could be used. In the illustrated example, light of wavelength $\lambda_1$ is directed into an output optical fiber 74a and light of wavelength $\lambda_7$ is directed into another output optical fiber 74b, etc. Each of the output optical fibers 74 from the demultiplexer 72 feeds a corresponding modulator 78 (individually labeled as modulators 78a, 78b, etc.) that modulates the light carried by the optical fiber by amplitude and/or phase in order to transmit information.

In a data center embodiment, electronic signals representing data from servers (e.g., one or more of servers $server_1$-$server_N$) that is to be transmitted to a remote device drive the modulators to encode the data onto the light of a particular wavelength. After modulation, the modulated light from each of the modulators 78 can be combined into a single optical fiber 86 by an optical multiplexer 82. The multiplexer 82 could be an AWG or cyclic AWG, although other optical multiplexers could be used. The optical fiber 86 from the output of the multiplexer 82 can then be routed to its intended destination.

At the intended destination, the different wavelengths of light are split into multiple optical fibers by a demultiplexer 84 (e.g., an AWG or the like). Light from the demultiplexer 84 can be supplied to receivers (not shown) that demodulate the light of a particular wavelength to recover the data from a source (e.g., from one or more of the servers $server_1$-$server_N$).

As will be appreciated, the fiber optic switching network shown in FIG. 1 not only reduces the number of lasers required to provide light to each of the optical fibers but also reduces the number of fibers that need to be routed between a laser source (e.g., the comb laser source 60) and a destination (e.g., a location of the modulators 78 and/or multiplexer 82) based on the capacity of the demultiplexer 72. For example, if the demultiplexer 72 can direct light into 16 different output optical fibers, then there can be up to a 16:1 reduction in the number of fibers that must be routed to the destination. In addition, separating the laser source 60 from the modulators 78 allows each component to be upgraded or repaired without requiring an upgrade or replacement of the other.

In some embodiments, the comb laser source 60 and/or the AWG 66 may be located remotely from the demultiplexer 72, the modulators 78, and/or the multiplexer 82. Accordingly, the light (e.g., wavelength bands) carried by the different output optical fibers (e.g., 68a, 68b, etc.) can be fed remotely from the AWG 66 to the demultiplexer 72, which can be located elsewhere. For example, in a data center embodiment, the comb laser source 60 and AWG 66 can be located in a first building while the demultiplexer 72, modulators 78, and multiplexer 82 are located in a second building different from the first building (e.g., proximate to one or more of the servers $server_1$-$server_N$). The switching network 50 can therefore greatly reduce the number of optical fibers needed for routing light between the first and second buildings as compared to, for example, a network in which individual laser sources (producing only a single wavelength) are located in the first building and require separate optical fibers for light transmission to a corresponding modulator in the second building.

Although not shown, other components can be included in the optical switching network including optical interleavers, wavelength selective switches (WSS), N×M optical switches or the like. Such components can be used to route optical signals between a source and a destination in the network.

The optical switching network shown in FIG. 1 can be used within a building, between buildings, in a campus or metropolitan area, or for long haul applications.

In a particular aspect of the present technology, a fiber optic switching network includes a laser comb source configured to produce laser light at a plurality of wavelengths on a single optical fiber, and an optical demultiplexer configured to receive the plurality of wavelengths and direct different wavelengths into different output optical fibers. The fiber optic switching network can also include two or more optical modulators configured to modulate the light received from the optical demultiplexer, and an optical multiplexer configured to combine modulated light from the two or more optical modulators into a single optical fiber that is routed to an intended destination. In some embodiments, the demultiplexer is an arrayed wave guide or a cyclic arrayed wave guide.

Figure 2:
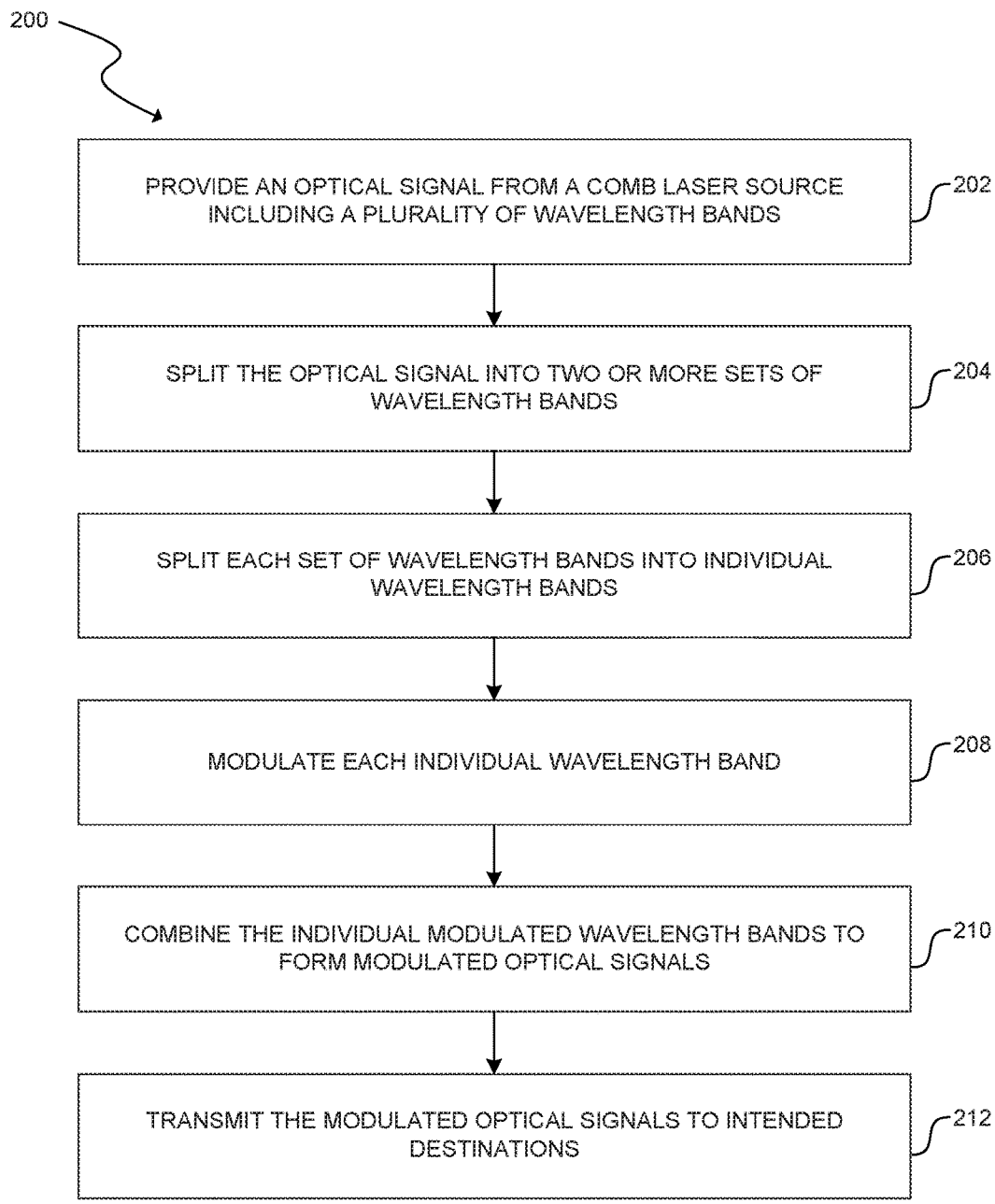
FIG. 2 is a flow diagram of a process or method for optical communication in accordance with embodiments of the present technology.

FIG. 2 is a flow diagram of a process or method 200 for optical communication in accordance with an embodiment of the present technology. The process 200 can be carried out, for example, in and/or by the switching network 50 illustrated in FIG. 1. Beginning at block 202, the process comprises providing an optical signal from a comb laser source (e.g., the comb laser source 60). The optical signal includes a plurality of wavelength bands, and can be carried by a single optical fiber (e.g., the single optical fiber 64) optically coupled to the comb laser source. In some embodiments, the wavelength bands are equally spaced. In certain embodiments, the comb laser source produces 100 or more individual wavelength bands.

At block 204, the process splits the optical signal into two or more sets of wavelength bands that each include at least two of the wavelength bands produced by the comb laser source. For example, a first demultiplexer (e.g., the AWG 66) can split the optical signal into n sets of wavelength bands (e.g., 4 sets where the AWG is a 4-channel AWG, 6 sets where the AWG is a 6-channel AWG, 8 sets where the AWG is an 8-channel AWG, 16 sets where the AWG is a 16-channel AWG, etc.). As one example, where the comb laser source produces 100 or more individual wavelength bands and the demultiplexer is a 6-channel AWG, each set of wavelength bands can include at least 16 individual wavelength bands. In some embodiments, the process cyclically splits (e.g., distributes) every $n^{th}$ wavelength band produced by the comb laser source into the same set (e.g., via the cyclic AWG 66). Each set the optical signal can be carried by a separate first output optical fiber (e.g., the output optical fibers 68a, 68b, etc.) optically coupled to an output of the demultiplexer.

At block 206, the process further splits each set of wavelength bands into individual wavelength bands. For example, a plurality of second demultiplexers (e.g., the demultiplexer 72) can be configured to each receive one of the sets of wavelength bands, and route each wavelength band to a corresponding output of the second demultiplexer. Each wavelength band can be further carried by a second output optical fiber (e.g., the output optical fibers 74a, 74b, etc.) optically coupled to a an output of the second demultiplexers.

At block 208, the process modulates each wavelength band to, for example, encode data onto the wavelength band. Specifically, a plurality of modulators (e.g., the modulators 78a, 78b, etc.) can be optically coupled to the second demultiplexers (e.g., to the second output optical fibers) for receiving and modulating individual wavelength bands by a corresponding data signal to encode data onto the individual wavelength bands;

At block 210, the process combines the modulated wavelength bands to form modulated optical signals for transmission on a single optical fiber. For example, a plurality of multiplexers (e.g., the multiplexer 82) can be optically coupled to the plurality of modulators and configured to combine at least two of the modulated wavelength bands to form a modulated optical signal. In some embodiments, each optical multiplexer can combine the modulated wavelength bands to form one of the different sets of wavelength bands with modulated data carried therein. That is, after modulation, each of the wavelength bands from a set of wavelength bands that was split at block 206 are recombined into the same modulated optical signal and onto a single optical fiber (e.g., the single optical fiber 86). In other embodiments, only some of the same wavelength bands are combined for transmission on a common optical fiber as a modulated optical signal.

At block 212, the process transmits the modulated optical signals to one or more intended destinations. The intended destinations can be the location of a user (e.g., a user requesting content from a social networking system or a video streaming service), another location in the data center, a different location in a metropolitan area, etc. In some embodiments, the process 200 can further include (a) receiving the modulated portions of the optical signal at the intended destination, (b) splitting the modulated portions of the optical signal into their constituent individual modulated wavelength bands (e.g., via a demultiplexer at or proximate to the intended destination), (c) transmitting the individual modulated wavelength bands to one or more receivers (e.g., a receiver at or proximate to the intended destination), and/or (d) demodulating the modulated wavelength bands to recover the data encoded onto each band.

Figure 3:
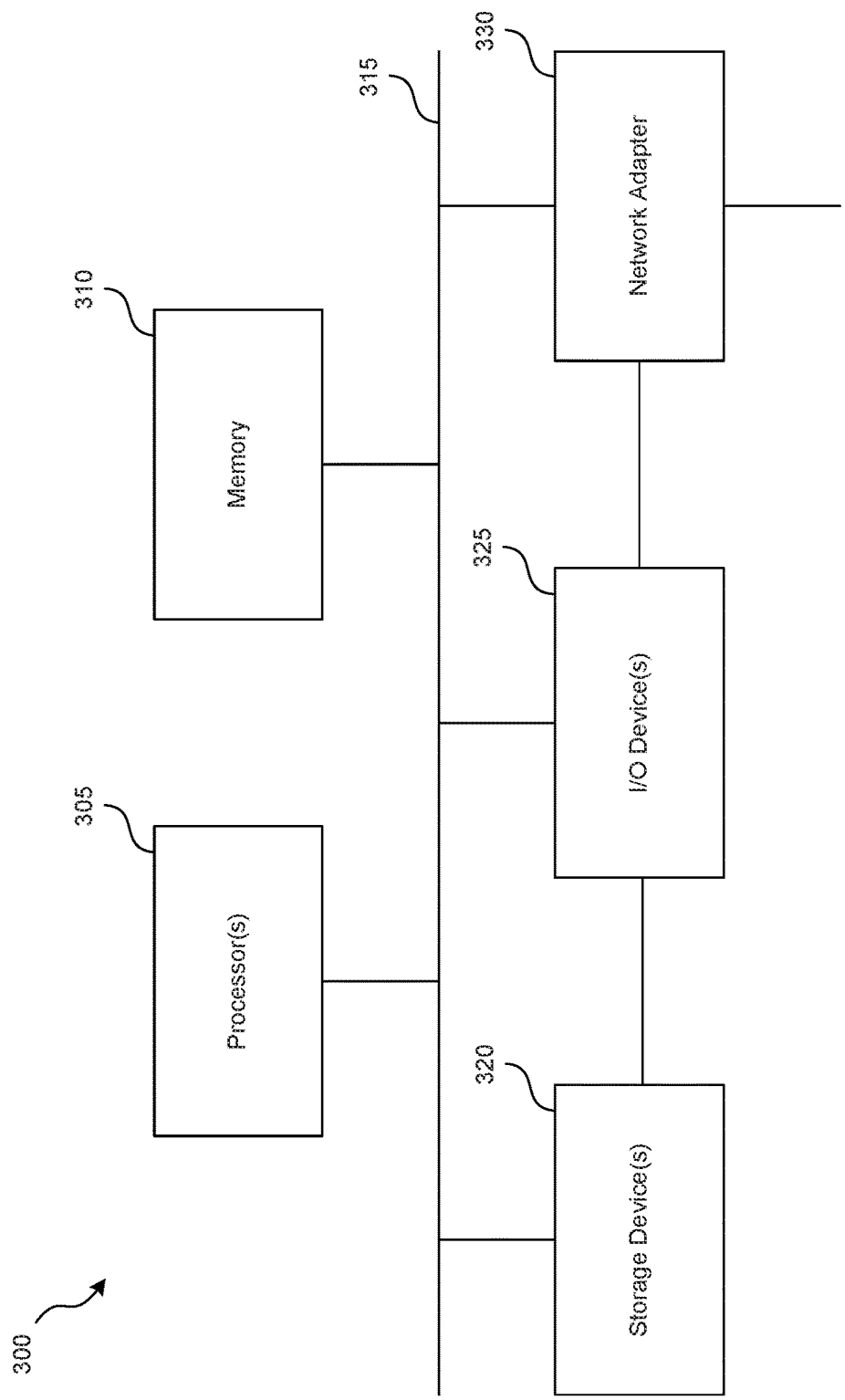
FIG. 3 is a schematic diagram of a computing device in accordance with embodiments of the present technology.

Embodiments of the subject matter and the operations described in this specification can be implemented in digital electronic circuitry, or in computer software, firmware, or hardware, including the structures disclosed in this specification and their structural equivalents, or in combinations of one or more of them. For example, operations and management of the disclosed components, including the modulators, comb laser source, cyclic AWG, etc., can be implemented under the control of one or more computing devices. FIG. 3 is a block diagram of such a computing system, consistent with various embodiments. The computing system 300 may include one or more central processing units ("processors") 305, memory 310, input/output devices 325 (e.g., keyboard and pointing devices, display devices, etc.), storage devices 320 (e.g., disk drives), and network adapters 330 (e.g., network interfaces) that are connected to an interconnect 315. The interconnect 315 is illustrated as an abstraction that represents any one or more separate physical buses and/or point-to-point connections connected by appropriate bridges, adapters, or controllers. The interconnect 315, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire."

The memory 310 and storage devices 320 are computer-readable storage media that may store instructions that implement at least portions of the described technology. For example, the memory 310 and/or storage devices 320 may store instructions executable by one or more of the processors 305 for carrying out some aspects of the process 200 (FIG. 2). In addition, the data structures and message structures may be stored or transmitted via a data transmission medium, such as a signal on a communications link. Various communications links may be used, such as the Internet, a local area network, a wide area network, or a point-to-point dial-up connection. Thus, computer-readable media can include computer-readable storage media (e.g., "non-transitory" media) and computer-readable transmission media.

The instructions stored in memory 310 can be implemented as software and/or firmware to program the processor(s) 305 to carry out actions described above. In some embodiments, such software or firmware may be initially provided to the computing system 300 by downloading it from a remote system through the computing system 300 (e.g., via network adapter 330).

The technology introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

From the foregoing, it will be appreciated that specific embodiments of the disclosed technology have been described herein for purposes of illustration, but that various modifications may be made without deviating from the scope of the invention. Numerous specific details are described to provide a thorough understanding of the disclosure. However, in some instances, well-known details are not described in order to avoid obscuring the description. Further, various modifications may be made without deviating from the scope of the embodiments. The features of the embodiments described herein may be combined in all possible combinations of methods, apparatus, modules, systems, and computer program products.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

We claim:

1. A fiber optic switching network, comprising:
a comb laser source configured to produce laser light at a plurality of wavelengths on a single optical fiber;
an optical demultiplexer coupled to the comb laser source and configured to receive light having a first set of the plurality of wavelengths and direct different wavelengths from the first set of plurality of the wavelengths into different output optical fibers;
two or more optical modulators configured to modulate the light received from the optical demultiplexer, each modulator coupled to one of the different output optical fibers to receive light of a particular wavelength and to modulate the light of the particular wavelength in accordance with a corresponding data signal; and
an optical multiplexer coupled to the two or more optical modulators and configured to combine modulated light from the two or more optical modulators into a single optical fiber for routing to an intended destination.

2. The fiber optic switching network of claim 1, wherein the optical demultiplexer is coupled to an arrayed waveguide grating configured to receive the laser light from the comb laser source and output the light having the first set of the plurality of wavelengths.

3. The fiber optic switching network of claim 1, wherein the optical demultiplexer is coupled to a cyclic arrayed waveguide grating having N output channels, where N is greater than 2, the cyclic arrayed waveguide grating configured to receive the laser light from the comb laser source and output the light having the first set of the plurality of wavelengths on a first output channel of the cyclic arrayed waveguide grating, wherein each of the wavelengths of the light on the first output channel of the cyclic arrayed waveguide grating is separated from an adjacent wavelength in the first output channel by N multiplied by the separation between each comb output of the comb laser source.

4. The fiber optic switching network of claim 1, wherein the plurality of wavelengths are approximately equally spaced.

5. The fiber optic switching network of claim 1, wherein the plurality of wavelengths includes at least 100 distinct wavelength bands.

6. The fiber optic switching network of claim 1, wherein the output optical fibers include at least 16 optical fibers.

7. The fiber optic switching network of claim 3, further comprising an additional demultiplexer configured to receive light having a second set of the plurality of wavelengths from a second output channel of the cyclic arrayed waveguide grating.

8. The fiber optic switching network of claim 3, wherein the cyclic arrayed waveguide grating has six output channels and is configured to direct every sixth comb of the comb laser source into the same output channel.

9. A method of optical communication, comprising:
   providing an optical signal from a comb laser source including a plurality of approximately equally spaced wavelength bands;
   splitting the optical signal into two or more sets of wavelength bands;
   using an optical demultiplexer to route light corresponding to each wavelength band within a first set of the wavelength bands to a corresponding output of the optical demultiplexer;
   using an optical modulator to modulate the light corresponding to each wavelength band that is output by the optical demultiplexer by a corresponding data signal to encode data onto the individual wavelength bands;
   combining the modulated wavelength bands to form a modulated optical signal for transmission on a single optical fiber; and
   transmitting the modulated optical signal to an intended destination via the single optical fiber.

10. The method of claim 9, wherein the wavelength bands in each set of the wavelength bands are not adjacent wavelength bands from the plurality of equally spaced wavelength bands.

11. The method of claim 9, further comprising:
    receiving the modulated optical signal at the intended destination; and
    splitting the modulated optical signal into to its constituent modulated wavelength bands.

12. The method of claim 9, further comprising receiving the data signal from one or more servers, the data signal intended for transmission to a remote device.

13. The method of claim 11, further comprising demodulating the modulated wavelength bands to recover the data encoded onto each band.

14. A system for optical communication, comprising:
    a comb laser source configured to produce laser light having a plurality of approximately equally spaced wavelength bands on a single optical fiber;
    an arrayed waveguide grating configured to receive the plurality of wavelength bands from the single optical fiber and direct different sets of wavelength bands into different output channels of the arrayed waveguide grating, wherein each set of wavelength bands includes two or more of the wavelength bands;
    a plurality of optical demultiplexers coupled to the output channels of the arrayed waveguide grating, wherein each optical demultiplexer is configured to receive one set of the wavelength bands and to direct each individual wavelength band within the received set of wavelength bands onto an output port of the optical demultiplexer;
    a plurality of optical modulators coupled to the plurality of optical demultiplexers, wherein each optical modulator is configured to modulate the individual wavelength band received from one output port of the plurality of optical demultiplexers in accordance with a data signal; and
    a plurality of optical multiplexers coupled to the plurality of optical modulators, wherein each optical multiplexer is configured to combine the modulated wavelength bands to form one of the different sets of wavelength bands with modulated data carried therein for transmission to an intended destination.

15. The system of claim 14, wherein the arrayed waveguide grating is a cyclic arrayed waveguide grating that cyclically directs individual wavelength bands into an output channel of the cyclic arrayed waveguide grating.

16. The system of claim 14, wherein the plurality of optical demultiplexers includes at least 6 optical demultiplexers.

17. The system of claim 14, wherein the data signal corresponds to data from one or more servers, and wherein the data signal is used to drive the optical modulators to encode data from the one or more servers onto each wavelength band.

18. The system of claim 14, further comprising a plurality of additional optical demultiplexers coupled to the plurality of optical multiplexers, wherein each of the additional optical demultiplexers is configured to receive one set of the wavelength bands with modulated data carried thereon and to direct each individual modulated wavelength band within the received set of wavelength bands with modulated data carried thereon onto one output port of the additional optical demultiplexer.

19. The system of claim 14, wherein the arrayed waveguide grating includes six output channels, and wherein the plurality of wavelength bands includes at least 100 wavelength bands.

20. The system of claim 18, further comprising a plurality of receivers coupled to the plurality of additional optical demultiplexers, wherein each receiver is configured to receive the individual modulated wavelength band from one output port of the plurality of additional optical demultiplexers and to demodulate the individual modulated wavelength band to recover data encoded thereon.

* * * * *